United States Patent [19]
Murakami et al.

[11] Patent Number: 5,746,002
[45] Date of Patent: May 5, 1998

[54] MEASURING APPARATUS FOR MEASURING A BEARING HEIGHT OF PLAIN BEARING HALF

[75] Inventors: Hiroshi Murakami; Masanori Tsutsui; Katsumi Asai; Takayoshi Sasaki, all of Nagoya, Japan

[73] Assignee: Diado Metal Company Ltd., Nagoya, Japan

[21] Appl. No.: 710,557

[22] Filed: Sep. 19, 1996

[30] Foreign Application Priority Data

Sep. 26, 1995 [JP] Japan .................... 7-273598

[51] Int. Cl.⁶ .............. G01B 5/02; G01B 5/06; G01B 13/02; G01B 121/20
[52] U.S. Cl. ........................... 33/517; 33/555
[58] Field of Search .............. 73/865, 8; 33/517, 33/555, DIG. 17

[56] References Cited

U.S. PATENT DOCUMENTS

| | | | |
|---|---|---|---|
| 3,206,830 | 9/1965 | Hart et al. | 29/898.057 |
| 3,864,835 | 2/1975 | Morisaki . | |
| 3,928,918 | 12/1975 | Morisaki | 33/517 |
| 4,610,095 | 9/1986 | Tannery | 33/517 |
| 4,663,857 | 5/1987 | Mori | 33/517 |

FOREIGN PATENT DOCUMENTS

| | | |
|---|---|---|
| 61-182513 | 8/1986 | Japan . |
| 1640519 | 4/1991 | Russian Federation ......... 33/517 |

*Primary Examiner*—Thomas P. Noland
*Attorney, Agent, or Firm*—Browdy and Neimark

[57] ABSTRACT

A measuring apparatus for speedily measuring a bearing height is disclosed. A plunger of a movable cylinder is extended with a test load P by a constant pressure applying mechanism S. The movable cylinder is ascended from a receded position to a measuring position by a slide cam. A bearing half W disposed on a pushing member is fitted in a receiving cavity of a standard tool in such a manner that an end of the bearing half W slightly protrudes from the receiving cavity portion. When the movable cylinder slightly exceeds the measuring position, a plunger is pressed for the length of the end protruded from the receiving cavity portion. At this point, the bearing half W is held with the test load P. Thus, the bearing height can be immediately measured by a length sensor.

4 Claims, 4 Drawing Sheets

MEASURING APPARATUS FOR MEASURING A BEARING HEIGHT OF PLAIN BEARING HALF

BACKGROUND OF THE INVENTION

The present invention relates to a measuring apparatus for measuring the bearing height of a plain bearing half under the condition that a predetermined test load is applied.

As is well known, a semi-circular plain bearing (hereinafter merely referred to as a bearing half) is incorporated with a counterpart of the same shape to form a circular bearing. In other words, a pair of bearing halves are incorporated to form a circular bearing body. Thus, the dimensional accuracy of the assembled bearing halves is very important. Consequently, the bearing height of each bearing half is measured by applying a test load (P) approximate to an actual load which is applied when the bearing halves are assembled to a housing. According to JIS D3102 (Japanese Industrial Standards), for example, a bearing half is fitted in a semi-circular receiving cavity B of a standard tool A so as to hold the bearing half in the true semi-circular shape as shown in FIG. 5. The bearing half is held in such a manner that an end thereof slightly protrudes from the receiving cavity B. A predetermined test load P is applied to the protruded end by a pressing board C. In this condition, the bearing height H of the bearing half is measured by a measuring device D. There is prescribed in JIS D3102 that, when the inner diameter of the bearing half is in a range from 40 to 80 mm, the tolerance of the bearing height H should be within 0.04 mm.

There is a prior art measuring apparatus for measuring the bearing height of such bearing disclosed in JP-A-61-182513 by the same assignee of the present invention. According to the conventional measuring apparatus, the protrusion height of the bearing half is measured such that the bearing half is fitted in the receiving cavity by a pressing means and a test load P is applied to the bearing half. A double-acting single-rod type cylinder secured to the housing of the measuring apparatus is used as the pressing means. A pushing member which pushes the bearing half is provided to one end of a plunger which slidably moves in the cylinder.

However, in such a conventional type of the measuring apparatus, when a bearing half is loaded, the plunger moves to slide in the cylinder between a receded position and an advanced position. Because of a comparatively long stroke of the plunger between the two positions, a considerable amount of pressure fluid flows into and out from the cylinder during reciprocating mortion of the plunger.

Since the bearing height should be measured with a stable test load P, a delay of the pressuring fluid in operation primarily due to resistance of a flow in the cylinder device cannot be ignored, which prevents a quick measuring of the bearing height.

SUMMARY OF THE INVENTION

An object of the present invention is to provide a measuring apparatus by which the bearing height can be quickly determined.

According to a first feature of the present invention, there is provided a measuring apparatus for measuring a bearing height of a plain bearing half which comprises a standard tool having a receiving cavity in which the plain bearing half is fitted in such a manner that an end thereof protrudes from the receiving cavity;

pressing means which is opposite to said standard tool and adapted to press the end of the plain bearing half with a test load; and measuring means for measuring the bearing height when the end of the plain bearing half is pressed by said pressing means, wherein said pressing means comprises:
a movable cylinder;
a driving mechanism for moving the movable cylinder from a receded position to an advanced position at which a test load is exerted to the plain bearing half;
a constant pressure applying mechanism for pressing and holding a plunger of the movable cylinder with the test load; and
a pushing member which is caused by the plunger to push the end of the plain bearing half.

According to the first feature of the present invention, the test load is always applied to the plunger of the movable cylinder by the constant pressure applying mechanism during operation so that the plunger is extended. The movable cylinder is driven by the driving mechanism so as to move from the receded position to the advanced position at which a test load is exerted to the bearing half to be measured. The plunger causes the pushing member to push the bearing half at one end thereof to fit it in the receiving cavity of the standard tool in such a manner that the end thereof protrudes outside of the receiving cavity. When the movable cylinder moves to an advanced position over the predetermined position for measuring, the plunger is pushed backward by a distance corresponding to the protrusion length of the protruded end portion of the bearing half. In this state, since the test load is still applied to the plunger by the constant pressure applying mechanism, the bearing half is continuously pushed under the test load pressure. Thus, the bearing height is immediately determined by the measuring means. After the bearing height is determined, the movable cylinder is driven to the receded position by the driving mechanism.

According to a second feature of the present invention, the pushing member mentioned above pushes the both ends of the bearing half, thereby it can be easily fitted in the receiving cavity.

According to a third feature of the present invention, the driving mechanism comprises a drive shaft having a cam for supporting the movable cylinder at the bottom, and a guide rail for slidably guiding the movable cylinder at a side portion. The movable cylinder is slidably engagement with the guide rail. When the drive shaft rotates together with the cam, the movable cylinder reciprocatably moves along the guide rail.

According to a fourth feature of the present invention, the measuring means is a length sensor of detecting a shifted distance of itself which is pushed by a pusher button which moves together with the pushing member whose position in its movement path corresponds to the bearing height of the bearing half.

These and other objects, features and advantages of the present invention will become more apparent in light of the following detailed description of the preferred embodiments thereof, as illustrated in the accompanying drawings.

DESCRIPTION OF THE PREFERRED EMBODIMENTS

With reference to FIGS. 1 to 5, embodiments of the invention will be now described.

Figure 1:
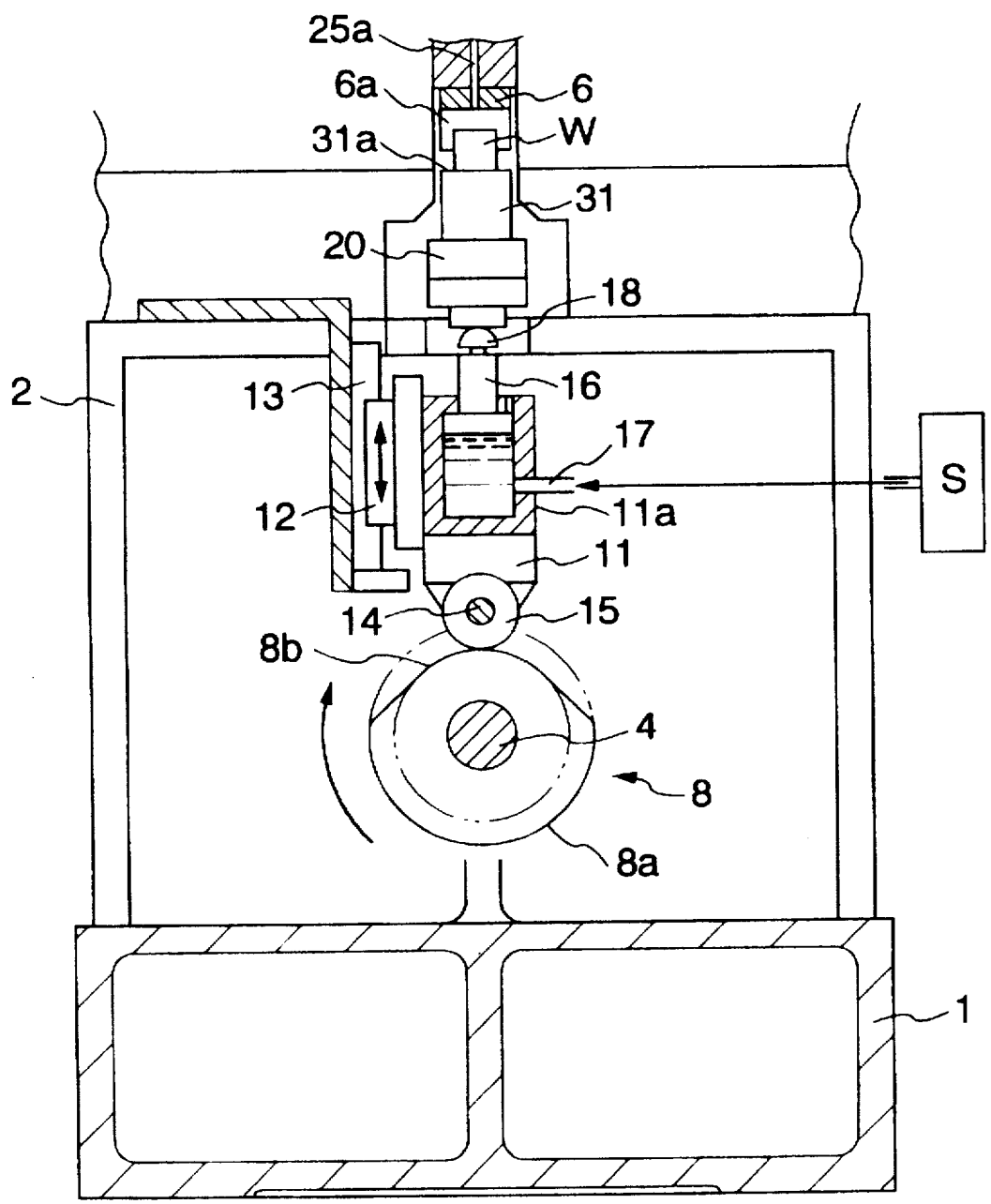
FIG. 1 is a partially exploded side view showing a measuring apparatus according to an embodiment of the invention.

As shown in FIG. 1, a housing 2 is disposed on a base 1. A drive shaft 4 is disposed at a comparatively lower position of the housing 2. The drive shaft 4 is rotated by a motor (not shown). A cam 8 is fixedly mounted on the drive shaft 4, which rotates together with the drive shaft 4 and which comprises a large diameter section 8a and a small diameter section 8b. A movable cylinder 11 is slidably supported on the cam surface at the bottom thereof. As the drive shaft 4 rotates, the movable cylinder 11 is shifted to ascend or descend in accordance with positions of the cam surface.

An engagement member 12 is disposed at a side portion of the movable cylinder 11. The movable cylinder 11 engages with a guide rail 13 secured to a frame of the housing 2 at the engagement member 12 to slidably ascend and descend along the guide rail 13. A wheel 15 is rotatably mounted on the bottom of the movable cylinder 11 through a wheel axle 14, which ensures a smooth movement of the movable cylinder 11 to ascend or descend in accordance with rotation of the cam 8.

The movable cylinder 11 comprises a cylinder body 11a in which a plunger 16 is reciprocatably fitted and which is provided with an oil port 17 at a lower side portion thereof. Oil or gas as a pressure fluid is filled in the cylinder chamber which is defined by the cylinder body 11a and the plunger 16, and to which an accumulator (a constant pressure applying mechanism) S is communicated. Regardless of the position of the plunger 16 relative to the cylinder body 11a, the fluid pressure in the cylinder chamber is maintained constantly by the accumulator S. A predetermined test load P is applied corresponding to the type of the bearing half W to be measured. Thus the plunger 16 pushes the upper end of the cylinder body 11a under the predetermined test load P. A pusher 18 having a semi-spherical shape is mounted on an upper end of the plunger 16. A pushing block 20 is located above the pusher 18 and supported by the same. A driving mechanism comprising the drive shaft 4 by which the movable cylinder 11 is shifted to ascend and descend and the accumulator S which provides the plunger 16 with a predetermined constant pressure, these are comprised in a pressing means.

Figure 2:
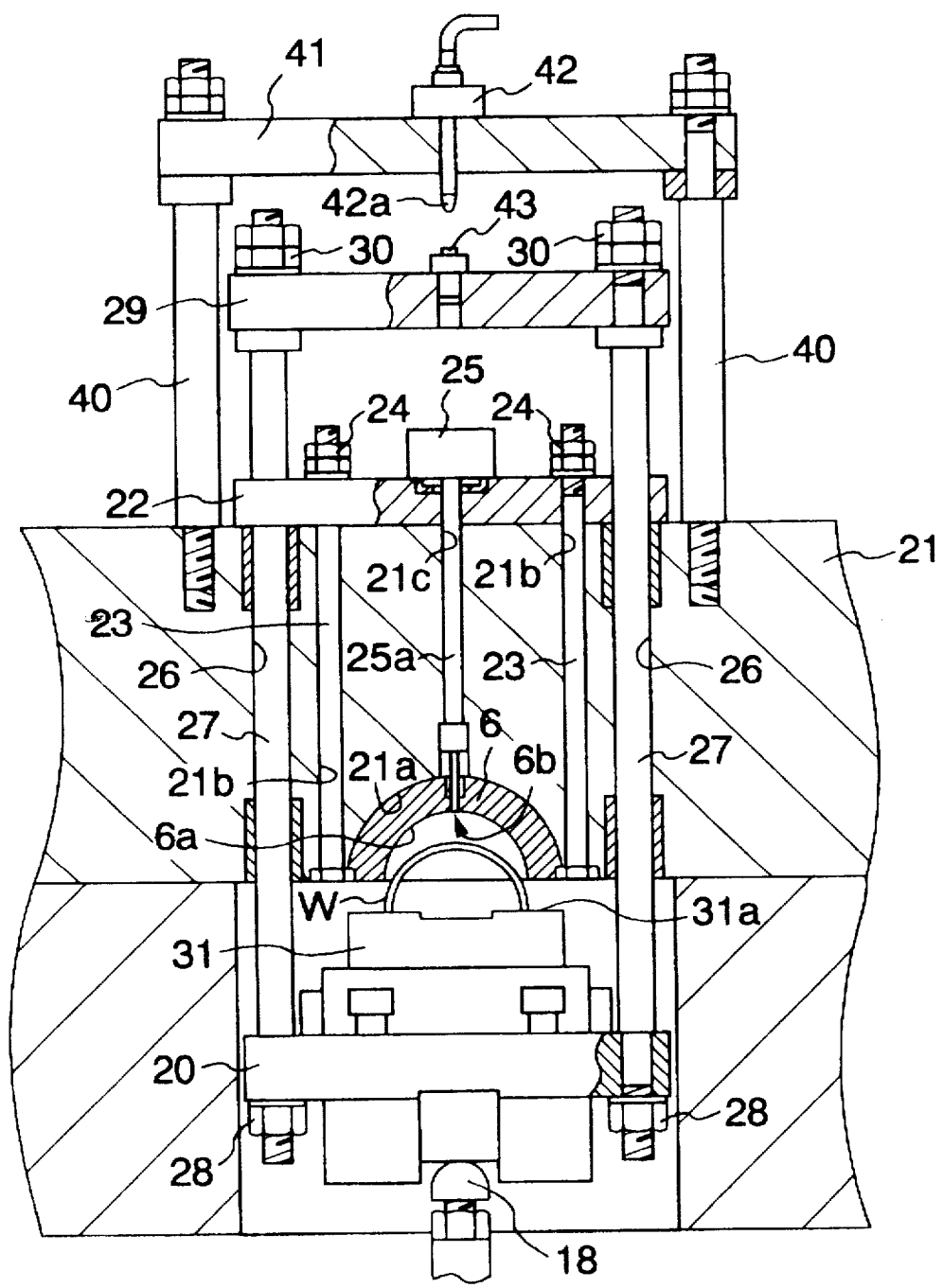
FIG. 2 is an enlarged front sectional view showing essential portions of the measuring apparatus according to the embodiment of the invention.

A support block 21 is fixedly disposed at an upper center position of the housing 2 as shown in FIG. 2. A mounting plate 22 is secured on the top surface of the support block 21. A cavity 21a, which receives a semi-circular standard tool 6, is formed on the bottom surface of the support block 21 in alignment with the axis along which the pusher 18 moves to ascend and descend. The support block 21 has through holes 21b, 21b which extend from the bottom surface to the top surface of the support block at both sides of the cavity 21a and in which clamp bolts 23, 23 are inserted. The semi-circular standard tool 6 having a comparatively big thickness is fitted in the tool receiving cavity 21a and held therein at both outer side edge portions by means of the heads of the clamp bolts 23 in co-operation with nuts 24 on the mounting plate 22.

The standard tool 6 has a semi-circular inner space or receiving cavity 6a into which the bearing half W to be measured is closely fitted in such a manner that both ends of the bearing half W slightly protrude out of the standard tool 6. The standard tool 6 has also a center through hold 6b for ejecting the bearing half W after measuring from the standard tool 6. The center through hole 6b is in alignment with another through hole 21c of the support block 21. An air cylinder 25 for ejection is mounted on the mounting plate 22. A push pin 25a which is driven by the air cylinder 25 extends through the through hole 6b and its distal end recedably protrudes from the through hole 6b of the standard tool 6. After a bearing height of the bearing half W is measured, the distal end of the push pin 25a protrudes from the through hole 6b so that the bearing half W is ejected from the inner space 6a of the standard tool 6.

The support block 21 has four guide holes 26 formed through the entire thickness thereof at both sides of the cavity 21a which receives the standard tool 6. Sliding shafts 27 are fitted in the guide holes 26, respectively. Both end portions of the sliding shafts 27 are formed as screws, respectively, and the lower pushing block 20 and an upper detection plate 29 are fixed thereto with nuts 28 and 30. Thus, a rectangular parallelepiped frame unit is composed of the sliding shafts 27, the pushing block 20 fixed at the lower end sections of the sliding shafts 27, and the detection plate 29 fixed at the upper end sections of the sliding shafts 27, can be integrally moved by the pusher 18 of the plunger 16. The pushing block 20 is moved to ascend and descend in accordance with movement of the movable cylinder 11.

An upper portion of the pushing block 20 is composed of a replaceable pressure plate (or a pushing member) 31 whose top is of a flat pushing surface 31a by which the both ends of the bearing half W is pressed. When the bearing half W is put on the pushing surface 31a and the movable cylinder 11 is raised, the pressure plate 31 pushes the both ends of the bearing half W.

Four vertical columns 40 are mounted on the upper surface of the support block 21, by which a holder plate 41 is supported. A length sensor 42 is disposed at the center of the holder plate 41, by which a movement distance of a sensor end 42a is detected when the sensor end 42a is pushed to recede. When the detection plate 29 is moved to ascend, a pusher button 43 mounted on the detection plate 29 pushes the sensor end 42a. In other words, when the pushing block 20 moves to ascend to apply the predetermined test load P to the bearing half W, its movement is restricted by the both ends of the bearing half w with respect to the bearing height thereof so that the sensor end 42a is pushed to recede by a distance corresponding to the bearing height. In this embodiment, at first, a reference bearing half, which is previously prepared and whose tolerance in size is zero, is set to the measuring apparatus and the receded position of the sensor end 42a is set as a zero tolerance so that a size of bearing height of every test piece can be detected in accordance with a receded distance of the sensor end 42a.

Figure 3A:
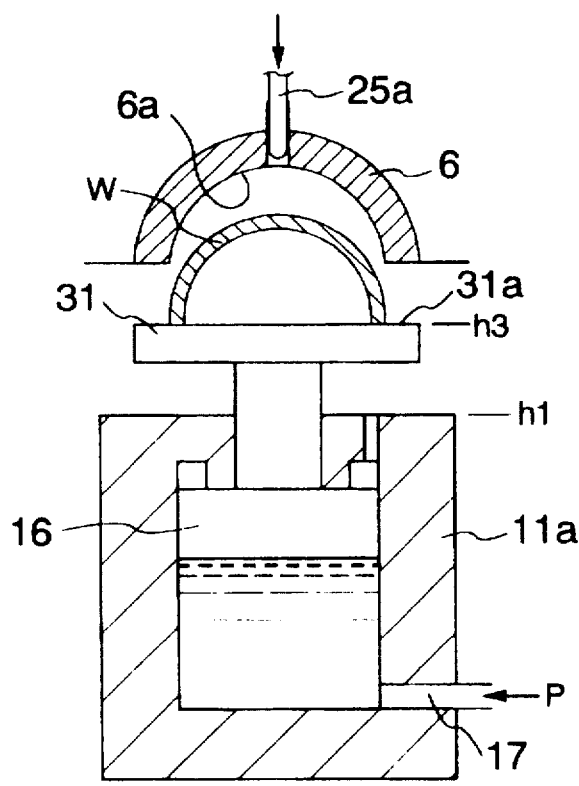
FIG. 3A is a schematic view showing the state that a movable cylinder is positioned in a receded position according to the embodiment of the invention.
Figure 3B:
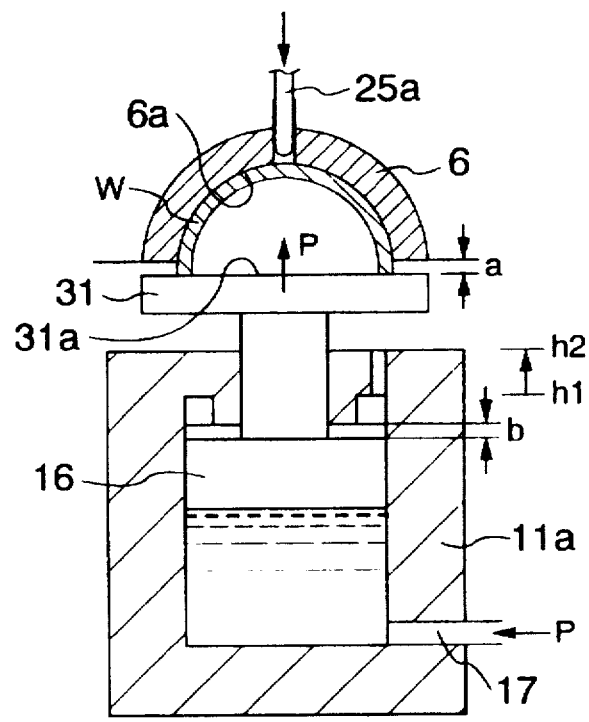
FIG. 3B is a schematic view showing the state that the movable cylinder is positioned in an advanced position according to the embodiment of the invention.

Mainly with reference to FIGS. 3A and 3B, the operation of the above-described embodiment will be now described.

A pressure as a test load P (for example, 50 kg/cm²) is applied to the cylinder body 11a by the accumulator S (FIG. 1). Thus, as shown in FIG. 3A, the plunger 16 is maintained at the extended position at the upper end of the cylinder body 11a.

The cylinder body 11a is supported at a receded position p (see FIG. 3A) by the small diameter portion 8b of the cam 8 shown in FIG. 1. The height level of the pushing surface 31a of the pressure plate 31 at the descent position h1 is set to h3.

As the drive shaft 4 rotates and the large diameter section 8a of the cam 8 contacts the wheel 15, the cylinder body 11a moves to ascend to an elevated position h2 shown in FIG. 3B. Thus, the bearing half W is closely fitted in the inner space 6a of the standard tool 6 by the pushing surface 31a. Consequently, the bearing half W is correctly held in the perfect semicircular shape along the center of the inner space 6a. In this state, the both ends of the bearing half slightly protrude from the inner space 6a by a distance a.

At this point, since the cylinder body 11a is moved to advance upwardly by around 1 mm over the distance of which the bearing half W is fitted in the inner space 6a, the plunger 16 maintained at the upper end position of the cylinder body 11a is receded into the cylinder body 11a by a distance b of around 1 mm. In addition, the bearing half W is pressed with the test load P from the accumulator S. Thus, the plunger 16 is pushed to recede into the cylinder body 11a by the distance b corresponding to distance a of which the bearing half W protrudes from the inner space 6a.

In other words, the detection plate 29 (pushing button 43) which moves together with the pushing block 20 pushes the sensor end 42a of the length sensor 42 by a distance corresponding to the movement in height of the pushing surface 31a (see FIG. 2). Thus, the sensor 42 determines the bearing height of the bearing half W. In this case, since the plunger 16 is deceded into the cylinder body 11a by the distance b, the amount of the pressure fluid discharged from the cylinder body 11a through the oil port 17 is very small. Thus, there is little delay in flow of the pressuring fluid due to the flowing resistance. Consequently, both the end surfaces of the bearing half W are pushed under a constant pressure (test load P) by the pushing surface 31a.

After the sensor 42 determines the bearing height, the cam 8 rotates and thereby the movable cylinder 11 moves to descend. Thus, the bearing half W is unloaded from the pushing surface 31a. Thereafter, the next bearing half W is loaded.

The present invention is not limited to the above-described embodiment. Instead, the present invention can be modified as follows.

Figure 4:
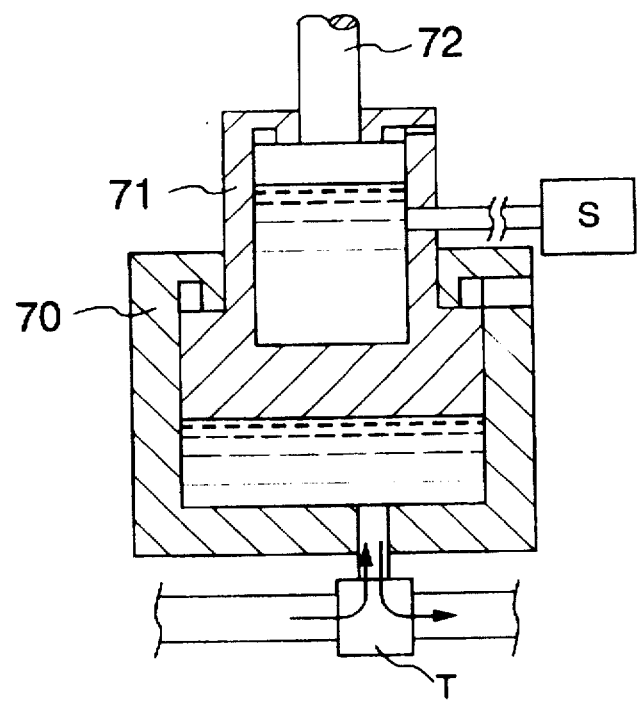
FIG. 4 is a schematic view showing a driving mechanism according to another embodiment of the invention.

(1) In the above embodiment, the movable cylinder 11 is moved to ascend and descend by the cam 8 as the driving mechanism. However, the driving mechanism is not limited to such a cam drive mechanism. Instead, another mechanism can be used. For example, FIG. 4 shows a cylinder drive mechanism using a drive cylinder 70 as the driving mechanism. In the drive cylinder 70, a movable cylinder 71 is driven to ascend and decend with an oil pressure within the drive cylinder 70 controlled by a switch T. A plunger 72 of the movable cylinder 71 is pushed with the test load P from the accumulator S. Since the plunger 72 moves relative to the movable cylinder 71 by a considerably small distance, when the bearing half is pressed with the test load P, the amount of oil discharged from the movable cylinder 71 to the accumulator S is very small. Thus, the bearing height of the bearing half can be speedily determined without delay in an oil flow.

(2) In the above-described embodiment, the sensor 42 is disposed on the holder plate 41 which is supported by the vertical columns 40. The sensor 42 is pushed at its end 42a by the pushing button 43 disposed on the detection plate 29 that moves along with the pushing block 20 so as to measure the bearing height of the bearing half W. However, the measuring means is not limited to such structure. Instead, another type of the length sensor can be available. Alternatively, the length sensor may be directly disposed on the pushing block 20.

Figure 5:
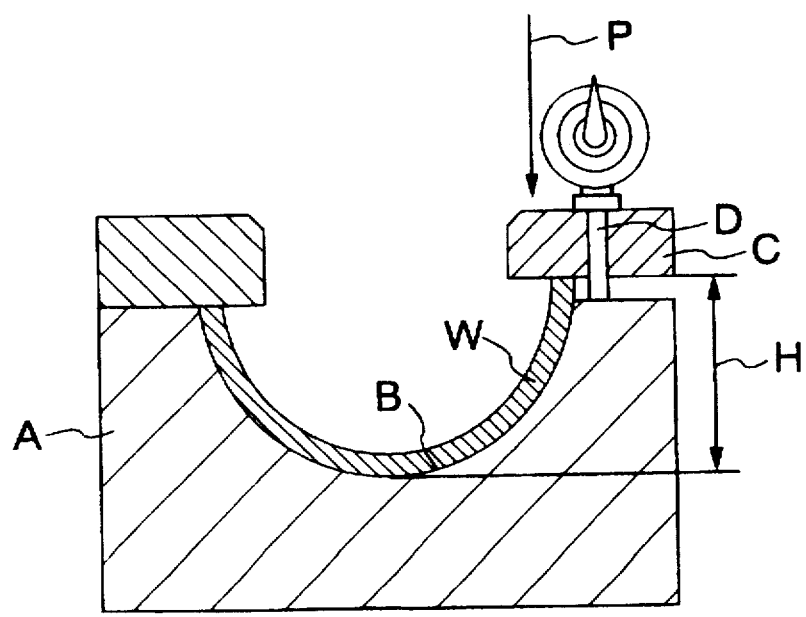
FIG. 5 is a schematic view for explaining a conventional measuring method for a bearing height.

(3) In the above-described embodiment, both the ends of the bearing half W are pushed by the pushing surface 31a of the pressure plate 31. However, as shown in FIG. 5, an one end pushing structure, in which one end of the bearing half is stopped to move and the other end thereof is pushed, may be used.

As will be apparent from the above, according to the first feature of the present invention, the pressing means comprises a movable cylinder, a driving mechanism for moving the movable cylinder from a receded position to an advanced position, a constant pressure applying means for pressing and holding a plunger of the movable cylinder with the test load, and a pushing member for causing the plunger to push the end of the plain bearing half. Thus, the bearing height can be quickly determined by the measuring apparatus.

In each of the second to fourth aspects of the present invention, the measuring apparatus for measuring the bearing height of the bearing half of the first aspect is individually embodied. According to the second aspect of the present invention, since the pushing member presses both the ends of the bearing half, it can be more quickly loaded and unloaded.

According to the third aspect of the present invention, the driving mechanism comprises a drive shaft having a cam for supporting a bottom portion of the movable cylinder, and a guide rail for slidably mounting a side portion of the movable cylinder. Thus, the driving mechanism can be simply structured.

According to the fourth aspect of the present invention, the measuring means is a length sensor for detecting the amount in movement of the sensor end thereof when it is pushed by a pushing button that moves together with the pushing member. Thus, the bearing height can be accurately determined.

Although the present invention has been shown and described with respect to the preferred embodiment thereof, it should be understood by those skilled in the art that the foregoing and various other changes, omissions, and additions in the form and detail thereof may be made therein without departing from the spirit and scope of the present invention.

What is claimed is:

1. A measuring apparatus for measuring a bearing height of a plain bearing half, comprising:
    a standard tool having a receiving cavity in which the plain bearing half is fitted in such a manner that opposing ends thereof protrude from the receiving cavity;
    pressing means which is opposite to said standard tool and adapted to press the opposing ends of the plain bearing half with a test load; and
    measuring means for measuring the bearing height when the opposing ends of the plain bearing half are pressed by said pressing means,
    wherein said pressing means comprises:
        a movable cylinder;
        a driving mechanism for moving the movable cylinder from a receded position to an advanced position at which a test load is exerted to the plain bearing half;
        a constant pressure applying mechanism for pressing and holding a plunger of the movable cylinder with the test load; and
        a pushing member which is caused by the plunger to push the both opposing ends of the plain bearing half.

2. The measuring apparatus according to claim 1, wherein the driving mechanism comprises:

a drive shaft having a cam for supporting a bottom of the movable cylinder; and a guide rail for slidably guiding the movable cylinder.

3. The measuring apparatus according to claim 1, wherein said measuring means is a length sensor for detecting a shift distance of a detecting end thereof which is pushed by a pusher button that moves together with the pushing member.

4. The measuring apparatus according to claim 3, wherein the driving mechanism comprises:

a drive shaft having a cam for supporting a bottom of the movable cylinder; and a guide rail for slidably guiding the movable cylinder.

* * * * *